(12) United States Patent
Yee

(10) Patent No.: US 8,547,873 B2
(45) Date of Patent: *Oct. 1, 2013

(54) ESTABLISHMENT OF AD-HOC NETWORKS BETWEEN MULTIPLE DEVICES

(75) Inventor: James Yee, Hsinchu (TW)

(73) Assignee: Marvell International Ltd. (BM)

( * ) Notice: Subject to any disclaimer, the term of this patent is extended or adjusted under 35 U.S.C. 154(b) by 269 days.

This patent is subject to a terminal disclaimer.

(21) Appl. No.: 13/052,291

(22) Filed: Mar. 21, 2011

(65) Prior Publication Data

US 2011/0176457 A1 Jul. 21, 2011

Related U.S. Application Data

(63) Continuation of application No. 11/857,231, filed on Sep. 18, 2007, now Pat. No. 7,916,663.

(60) Provisional application No. 60/826,034, filed on Sep. 18, 2006.

(51) Int. Cl.
*H04L 12/28* (2006.01)

(52) U.S. Cl.
USPC ............................ 370/254; 370/338; 455/411

(58) Field of Classification Search
USPC .................................. 370/254, 338
See application file for complete search history.

(56) References Cited

U.S. PATENT DOCUMENTS

| | | | |
|---|---|---|---|
| 6,393,261 B1 | 5/2002 | Lewis | |
| 7,916,663 B2 * | 3/2011 | Yee ............................... | 370/254 |
| 2002/0126846 A1 | 9/2002 | Multerer et al. | |
| 2004/0107366 A1 | 6/2004 | Balfanz et al. | |
| 2005/0283553 A1 | 12/2005 | Droba | |
| 2006/0053276 A1 | 3/2006 | Lortz et al. | |
| 2006/0129807 A1 | 6/2006 | Halasz et al. | |
| 2006/0236383 A1 | 10/2006 | Cam-Winset et al. | |
| 2006/0239208 A1 | 10/2006 | Roberts et al. | |
| 2007/0079362 A1 | 4/2007 | Lortz et al. | |
| 2008/0037444 A1 | 2/2008 | Chhabra | |
| 2008/0044024 A1 | 2/2008 | Oh et al. | |
| 2009/0319788 A1 | 12/2009 | Zick et al. | |

FOREIGN PATENT DOCUMENTS

| | | |
|---|---|---|
| JP | 2005-110135 | 4/2005 |
| JP | 2005-229597 | 8/2005 |
| WO | WO 2005/101727 | 10/2005 |

OTHER PUBLICATIONS

Japanese Office Action dated Jul. 17, 2012 for Japanese Patent Application No. 2009-528528, including English translation of Summary of Notice of Reasons for Rejection.

(Continued)

*Primary Examiner* — Albert T Chou

(57) ABSTRACT

A method of configuring an ad-hoc wireless network between an authenticator and a plurality of wireless devices seeking authentication includes assigning a wireless device as the authenticator and receiving a first setup message transmitted from a first device seeking authentication to the authenticator and initiating a first handshake process between the authenticator and the first device seeking authentication. The method also includes receiving a second setup message transmitted from a second device seeking authentication to the authenticator. The second setup message is received by the authenticator prior to completion of the first handshake process. The method further includes initiating a second handshake process between the authenticator and the second device seeking authentication. The second handshake process is initiated prior to completion of the first handshake process. Moreover, the method includes completing the first handshake process and completing the second handshake process.

21 Claims, 9 Drawing Sheets

(56) References Cited

OTHER PUBLICATIONS

International Standard, ISO/IEC 8802-11, ANSI/IEEE Std. 802.11, First edition 1999-00-00 Information Technology—Telecommunications and information exchange between systems—Local and metropolitan area networks—Specific requirements—Part 11: Wireless LAN Medium Access Control (MAC) and Physical Layer (PHY) specifications; 531 pgs.

PCT International Search Report; Date of Mailing: Apr. 11, 2008; 2 pgs.

* cited by examiner

ESTABLISHMENT OF AD-HOC NETWORKS BETWEEN MULTIPLE DEVICES

CROSS-REFERENCES TO RELATED APPLICATIONS

This application is a continuation of U.S. application Ser. No. 11/857,231, filed Sep. 8, 2007, which claims priority under 35 U.S.C. §119(e) to U.S. Provisional Application No. 60/826,034, filed Sep. 18, 2006. The disclosures of the applications referenced above are incorporated herein by reference.

BACKGROUND OF THE INVENTION

The present invention relates to wireless communication networks, and more particularly to a protocol for establishing an ad-hoc wireless fidelity network.

Wireless networks are well known and are being increasingly used to exchange data. One known Wireless Local Area Network (WLAN) standard is the IEEE 802.11 standard, which defines the communication modes and the associated configuration protocols for an infrastructure WLAN.

There are three logical components in an infrastructure wireless network, namely a registrar, an access point (AP), and an enrollee. The terms authenticator and devices seeking authentication are used herein as alternative descriptors of the terms registrar and enrollee. Referring to FIG. 1A, to establish a wireless communications link with legacy AP 10, client 12 first seeks to acquire network credentials from external registrar 14. Subsequently, client 12 establishes a link to legacy AP 10 using the network credentials that client 12 has acquired from external registrar 14.

Referring to FIG. 1B, AP 20 is shown as having an embedded registrar. To establish a communications link with AP 20, client 22 first seeks to acquire network credentials from AP 20's embedded registrar over an 802.11 infrastructure network using an extended authentication protocol (EAP). Subsequently, using the acquired network credentials, client 22 wirelessly connects to AP 20.

Referring to FIG. 1C, to establish a communications link with AP 30, client 32 first seeks to acquire network credentials using EAP via AP 30. AP 30 relays the client 32's EAP message to registrar 34 using a Universal Plug and Play (UpnP) protocol defined by the UPnP™ Forum. Next, using the acquired network credentials supplied by registrar 34, client 32 establishes a communications link with AP 30.

Generally, ad-hoc networks are more suitable for portable electronic devices than infrastructure networks. However, present methods for configuring a network including multiple devices present ease of use issues that need to be addressed. For example, as portable electronic devices with wireless network capabilities become more pervasive, it would be desirable to enable three or more of such devices to form an ad-hoc, peer-to-peer, mesh, or other wireless network to exchange data without using an access point.

SUMMARY OF THE INVENTION

According to an embodiment of the present invention, a method of configuring an ad-hoc wireless network between an authenticator and a plurality of wireless devices seeking authentication is provided. The method includes assigning a wireless device as the authenticator and receiving a first setup message transmitted from a first device seeking authentication to the authenticator and initiating a first handshake process between the authenticator and the first device seeking authentication. The method also includes receiving a second setup message transmitted from a second device seeking authentication to the authenticator. The second setup message is received by the authenticator prior to completion of the first handshake process. The method further includes initiating a second handshake process between the authenticator and the second device seeking authentication. The second handshake process is initiated prior to completion of the first handshake process. Moreover, the method includes completing the first handshake process and completing the second handshake process.

According to another embodiment of the present invention, a wireless device adapted to configure an ad-hoc wireless network between the wireless device assigned as an authenticator and a plurality of wireless devices seeking authentication is provided. The wireless device includes a first port adapted to receive a first setup message transmitted from a first device seeking authentication to the wireless device and a first processor adapted to initiate a first handshake process between the wireless device and the first device seeking authentication. The wireless device also includes a second port adapted to receive a second setup message transmitted from a second device seeking authentication to the wireless device. The second setup message is received by the wireless device prior to completion of the first handshake process. The wireless device further includes a second processor adapted to initiate a second handshake process between the wireless device and the second device seeking authentication. The second handshake process is initiated prior to completion of the first handshake process. Moreover, the wireless device includes a third processor adapted to complete the first handshake process and a fourth processor adapted to complete the second handshake process.

According to yet another embodiment of the present invention, an apparatus adapted to configure an ad-hoc wireless network between a wireless device and a plurality of wireless devices seeking authentication is provided. The apparatus includes means for assigning a wireless device as the authenticator and means for receiving a first setup message transmitted from a first device seeking authentication to the authenticator and means for initiating a first handshake process between the authenticator and the first device seeking authentication. The apparatus also includes means for receiving a second setup message transmitted from a second device seeking authentication to the authenticator. The second setup message is received by the authenticator prior to completion of the first handshake process. The apparatus further includes means for initiating a second handshake process between the authenticator and the second device seeking authentication. The second handshake process is initiated prior to completion of the first handshake process. Moreover, the apparatus includes means for completing the first handshake process and means for completing the second handshake process.

According to a specific embodiment of the present invention, a method of establishing an ad-hoc wireless network between a plurality of wireless devices seeking authentication is provided. The method includes selecting one wireless device as an authenticator and generating one or more beacons at the authenticator, determining that a timer value is less than a predetermined time, and receiving a request from a first device of the plurality of wireless devices seeking authentication. The method also includes determining that an enrollee count is less than a predetermined maximum value, initiating a first handshake process between the authenticator and the first device, and increasing the enrollee count by one. The method further includes determining that the timer value is less than the predetermined value, receiving a request from a second device of the plurality of wireless devices seeking authentication, and determining that the enrollee count is less than the predetermined maximum value. Moreover, the method includes initiating a second handshake process between the authenticator and the second device.

According to another specific embodiment of the present invention, an authentication apparatus selected from a plurality of wireless devices and adapted to establish an ad-hoc wireless network between the authentication apparatus and wireless devices seeking authentication is provided. The authentication apparatus includes a first processor adapted to generate one or more beacons, a first decision module adapted to determine that a timer value is less than a predetermined time, and a first port adapted to receive a request from a first device of the wireless devices seeking authentication. The authentication apparatus also includes a second processor adapted to determine that an enrollee count stored in a memory is less than a predetermined maximum value, a third processor adapted to initiate a first handshake process between the authentication apparatus and the first device, and a memory controller adapted to increase the enrollee count stored in the memory by one. The authentication apparatus further includes a second decision module adapted to determine that the timer value is less than the predetermined value, a second port adapted to receive a request from a second device of the wireless devices seeking authentication, a fourth processor adapted to determine that the enrollee count is less than the predetermined maximum value, and a fifth processor adapted to initiate a second handshake process between the authentication apparatus and the second device.

According to yet another specific embodiment of the present invention, an authentication apparatus adapted to establish an ad-hoc wireless network between a plurality of wireless devices seeking authentication is provided. The authentication apparatus includes means for selecting one device as an authenticator and means for generating one or more beacons at the authenticator, means for determining that a timer value is less than a predetermined time, and means for receiving a request from a first device of the plurality of wireless devices seeking authentication. The authentication apparatus also includes means for determining that an enrollee count is less than a predetermined maximum value, means for initiating a first handshake process between the authenticator and the first device, and means for increasing the enrollee count by one. The authentication apparatus further includes means for determining that the timer value is less than the predetermined value, means for receiving a request from a second device of the plurality of wireless devices seeking authentication, and means for determining that the enrollee count is less than the predetermined maximum value. Moreover, the authentication apparatus includes means for initiating a second handshake process between the authenticator and the second device.

Many benefits are achieved by way of the present invention over conventional techniques. For example, embodiments of the present invention provide for increased usability of consumer electronics devices. Moreover, decreases in battery consumption are provided by some embodiments. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

In accordance with one embodiment of the present invention, an ad-hoc WLAN is established between three or more devices, such as Personal Digital Assistants (PDAs), digital cameras, phones, video game consoles, and the like. In conformity with a protocol governing the operation of the ad-hoc WLAN (hereinafter alternatively referred to as an ad-hoc network) of the present invention, each device in the network can be a registrar as well as an enrollee (client). In other words, in accordance with the present invention, each device is configurable to support both the registrar as well as the enrollee modes of operations. As described more fully below, multiple enrollees can concurrently perform setup negotiations or handshake processes with the registrar.

Figure 1A:
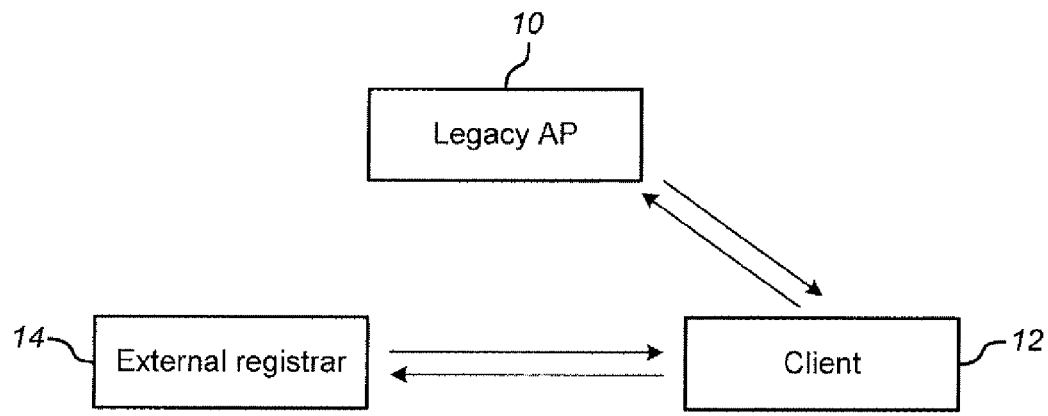
FIG. 1A-1C show various logical components of conventional infrastructure wireless networks.
Figure 1B:
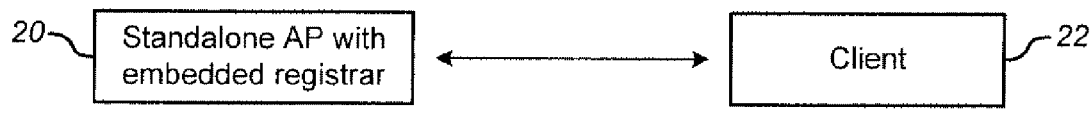
Figure 1C:
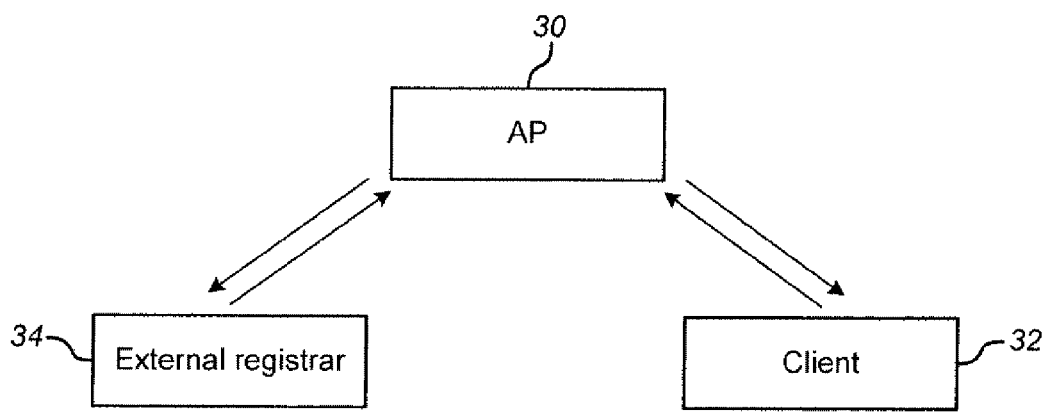
Figure 2:
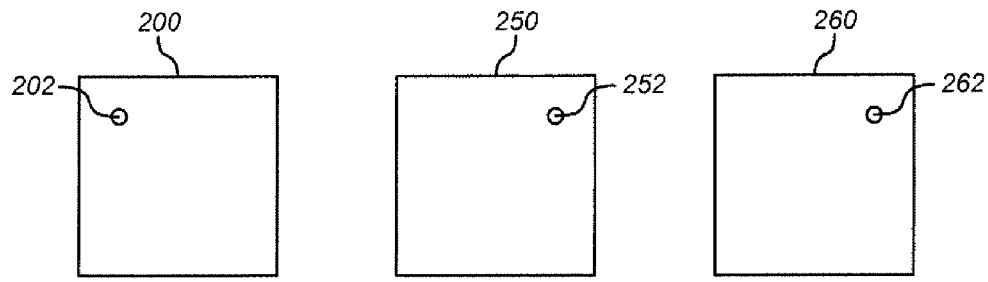
FIG. 2 shows a set of three devices to be configured to establish an ad-hoc network, in accordance with one embodiment of the present invention.

FIG. 2 shows a set of three devices 200, 250, and 260 that are configured to establish or join an ad-hoc network to exchange data, in accordance with one embodiment of the present invention. Assume that each of devices 200, 250, and 260 is initially in an Idle (also referred to herein as power-save) mode to reduce battery consumption or is otherwise turned off. In response to a user triggered event, such as the pressing of a hard/soft button on each of the devices, e.g., button 202 on device 200, button 252 on device 250, and button 262 on device 260, these devices exit the Idle mode or are otherwise turned on. In one embodiment, if within a predetermine time period, e.g., 5 seconds, of exiting the power-save mode, button 202 (or 252 or 262) is pressed again, device 200 (250, 260) is configured as an enrollee, i.e., assumes the role of an enrollee, otherwise device 200 (250, 260) is configured as a registrar, i.e., assumes the role of a registrar. In another embodiment, if within a predetermined time period, e.g., 5 seconds, of exiting the power-save mode, button 202 (252, 262) is pressed again, device 200 (250, 260) assumes the role of a registrar, otherwise device 200 (250, 260) assumes the role of an enrollee. To establish an ad-hoc network between these three devices, one of them is configured as a registrar and the other two are configured as enrollees. Assume that device 200 is configured as a registrar and devices 250 and 260 are configured as enrollees. Once registrar 200 is discovered by enrollees 250 and 260 and enrollees 250 and 260 complete their registration with registrar 200, enrollees 250 and 260 use the network credentials obtained from registrar 200 to establish communication over a wireless ad-hoc network to enable the secure exchange of data.

In the embodiment shown in FIG. 2, the same keys or buttons that are used to cause devices 200, 250, and 260 to exit their respective power-save modes, are also used to determine whether the devices assume the role of an enrollee or a registrar. In other embodiments, the key used to force a device out of the power-save mode may be different from the one used to select the configuration of the device as a registrar or an enrollee. In one embodiment, once a device is configured as a registrar, to become an enrollee, the device may be turned off and turned back on. In some embodiments, if a registrar does not detect an enrollee within a known time period, the registrar goes back into a power save mode or becomes an enrollee after a timeout. Moreover, in some embodiments, in response to a single user-triggered action, a multitude of enrollees may join the ad-hoc network after registering with the registrar. Thus, although three devices are illustrated in FIG. 2, this example is not intended to limit embodiments of the present invention. In typical applications, such as multi-player gaming applications, the number of devices that join the ad-hoc network may be three or more devices, for example, 4, 8, 16, or more devices.

In some embodiments, after the device is caused to exit the power-save mode in response to a user triggered event, the user is presented with an option of selecting between a registrar and an enrollee mode of configuration via a user interface disposed on the device. For example, if the device is equipped with a user interface, e.g., a Liquid Crystal Display (LCD) panel, the user is prompted on the LCD panel with an option of selecting between a registrar and an enrollee mode of configuration. By moving a cursor to one of the displayed entries, the user selects the desired mode of operation. In a similar manner, the enrollee is also configured to wake-up from the power save mode to look for a registrar.

Figure 3:
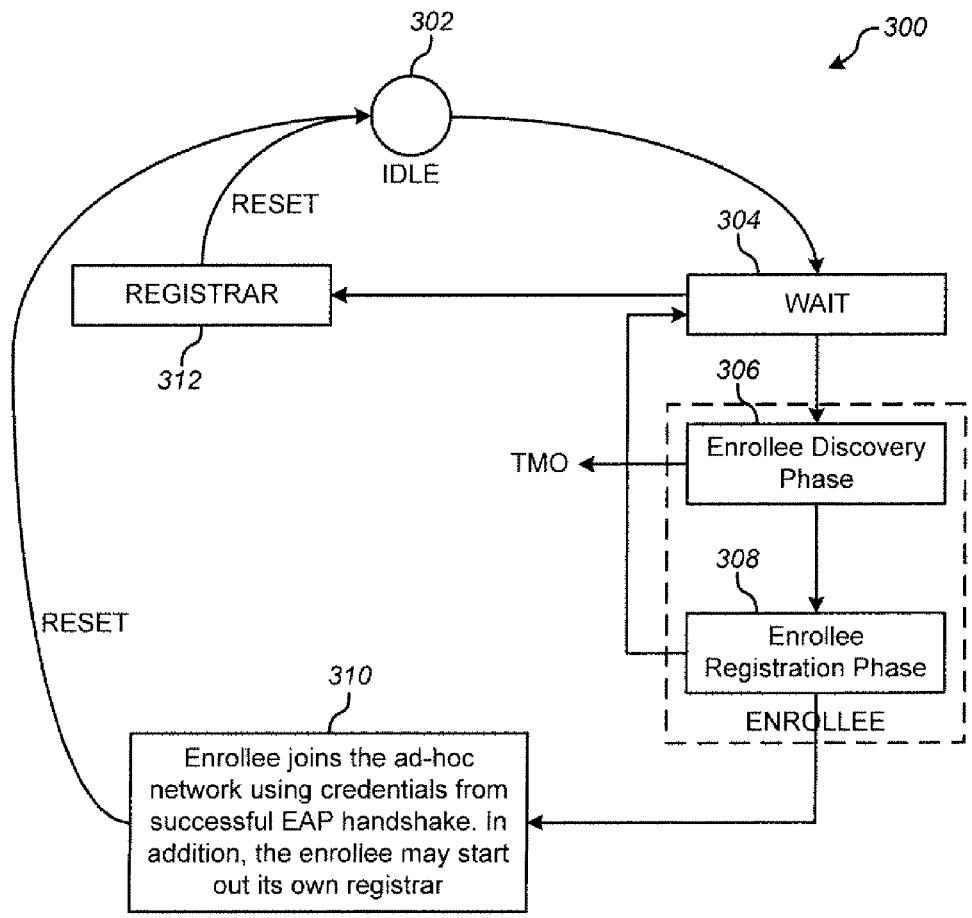
FIG. 3 is an exemplary state transition table associated with establishing a node's configuration status, in accordance with one embodiment of the present invention.

FIG. 3 is an exemplary state transition table 300 associated with establishing the configuration status of a device following an exit from a power-save mode, in accordance with one embodiment of the present invention. The device remains in Idle state 302 while in power-save mode. After exiting the power-save mode, a wireless module disposed in the device is activated and a transition to Wait state 304 is made. While in Wait state 304, if within a predetermined time period the user triggers an event, such as by pressing a hard/soft key or issuing a voice command, the device is configured as, i.e., assumes the role of, an enrollee and enters the enrollee discovery phase (state) 306 to scan for a registrar. If, on the other hand, the predetermined time period expires without a user-triggered event, a transition to state 312 is made and the device is configured as a Registrar to start its own ad-hoc network. The registrar transitions back to Idle mode 302 in response to a Reset signal.

If the enrollee discovers a registrar while in state 306, it transitions to enrollee registration phase 308 to start the registration process with the registrar. If, on the other hand, the enrollee does not discover a registrar while in state 306, the enrollee issues a timeout signal TMO. The enrollee may be configured to attempt to discover the registrar a predefined number of times before issuing the time out signal. If the attempt to discover the registrar is unsuccessful after the predefined number of attempts, the enrollee may create its own ad-hoc network and start a registrar application.

If the enrollee registration is successful in state 308, the enrollee transitions to state 310 and attempts to join the ad-hoc network using the credentials the enrollee has obtained from its successful EAP handshake, which may be a particular registration protocol exchange. If, on the other hand, the enrollee registration is unsuccessful while in state 308, the enrollee transitions back to Wait state 304. The enrollee may also start its own registrar application while in state 310. Following the operations in state 310, the enrollee transitions back to Idle state 302 in response to the Reset signal.

In some systems, to establish a secure mode of connection between an enrollee and a registrar, the user has to enter a PIN associated with the enrollee on the Registrar. Upon this entry, the enrollee and registrar proceed to establish a connection. In such systems, the beacons transmitted by the registrar to potential enrollees contain information conveying that the registrar communicates via a PIN mode only and that the registrar will not participate in a push-button mode of an ad-hoc network session. In yet other systems, the connection between the enrollee and registrar is established using a Secure Push Button Configuration (SPBC) mode in accordance with which the enrollee relays a PIN to the registrar via an optical signal, e.g. LED flashes, an audio signal, e.g., audio beeps, RF signals, etc. In other words, in such systems, the enrollee wirelessly transmits the PIN to the registrar, thus dispensing the need for a manual PIN entry by the user. Using the SPBC mode, security/authentication information may be introduced into the negotiation data, providing, for example, for negotiation only with devices in visual range. In other applications of the SPBC mode, a registrar or an enrollee can introduce a piece of authentication information or shared secret information into the handshake so that only certain devices (e.g., devices that are within visual range) can obtain the authentication information.

In some wireless standards, in order for a device to join the ad-hoc network, each enrollee is added to the network by the enrollees performing a setup negotiation with the registrar in a serial manner. Such an exemplary registration process is described in U.S. patent application Ser. No. 11/800,166, filed on May 4, 2007, which is commonly assigned and hereby incorporated by reference for all purposes. For example, referring to FIG. 2, in a serial registration process, enrollee 250 would join the network, followed by enrollee 260 joining the network. For security and other reasons, some protocols do not provide for the concurrent addition of multiple enrollees, only allowing the addition of one device to the ad-hoc network at a time. In such a protocol, the receipt of a second setup message while a first enrollee is registering, will be interpreted as a security violation and result in the second setup message and the first enrollee being rejected. In a protocol utilizing such a serial registration process, to add M enrollee devices into the network, a user has to take an action (e.g., push a button on the registrar device or another action) M times. Such a registration process is tedious for the registrar.

The use of such conventional procedures is not preferable for some consumer electronics (CE) applications, such as a multi-player gaming application, in which it is desirable to quickly add multiple devices into an ad-hoc network in response to a single user action (e.g., pushing of a button) taken on each device. Thus, embodiments of the present invention increase the usability of CE devices by reducing the number of steps used to establish the wireless network between multiple devices. Moreover, the total amount of time used to add such devices will also be reduced, which will improve the user experience. Because the availability of an AP cannot generally be guaranteed to a CE device, the use of ad-hoc networks is beneficial to users in numerous CE applications.

Embodiments of the present invention provide methods and system in which two or more enrollee devices can concurrently join an ad-hoc network in response to a single user action taken on a registrar device. The number of enrollees that can be added concurrently is a programmable function, providing flexibility as appropriate to the particular application. The number of enrollees and other criteria related to the concurrent addition of multiple enrollees is assigned locally at the registrar in some embodiments. The devices described herein are also backward-compatible with legacy devices.

As an example, in an application in which multiple CE devices communicate through the wireless ad-hoc network (e.g., 4, 8, 16, or more gaming devices participating in multi-player game), it is desirable to allow multiple devices to concurrently join the network. Considering a gaming application, the security concerns related to the network are minimal, since the information stored in the games is of limited interest to a potential hacker. On the other hand, ease of use is a key design criterion since the users generally want to join the network with a minimal amount of effort. The inventors have determined that the establishment of the ad-hoc network between multiple users in a serial manner detracts from the user experience in a gaming environment.

In some embodiments, in order to provide for concurrent registration of multiple enrollees, only the role of the registrar is modified and the operation of the enrollees is unchanged. As a result, in a single handshake session, multiple enrollees are able to communicate with the registrar. Generally, the identity of each of the multiple enrollees is defined by information (e.g., the address of an enrollee device) contained in the handshake message.

It is also possible for a group of devices to enroll or join in a network using a pre-defined local PIN. In some systems using a PBC mode, a fixed PIN value (e.g., zero) is used, providing no shared secret between multiple devices joining the network. Thus, the security provided by this default and potentially well-known PIN value is limited. Embodiments of the present invention may still conduct the PBC mode protocol, but use a non-zero PIN associated with the particular application. For example, in a multi-player gaming application, a pre-defined "game ID" can be used as a PIN to allow other devices playing the same game to enroll in the ad-hoc network concurrently. The use of such a "game ID" will provide for an additional measure of security during the concurrent registration of multiple devices in comparison with conventional methods. Additionally, based on the "game ID," the registrar can determine the maximum number of enrollees allowed to join the network. In some applications, detection of an unauthorized enrollee is also possible based on the registrar's knowledge of the particular application. For example, a registrar for a multi-player game may know a priori how many legitimate players will join and utilize such information in detecting unauthorized enrollees.

Figure 4:
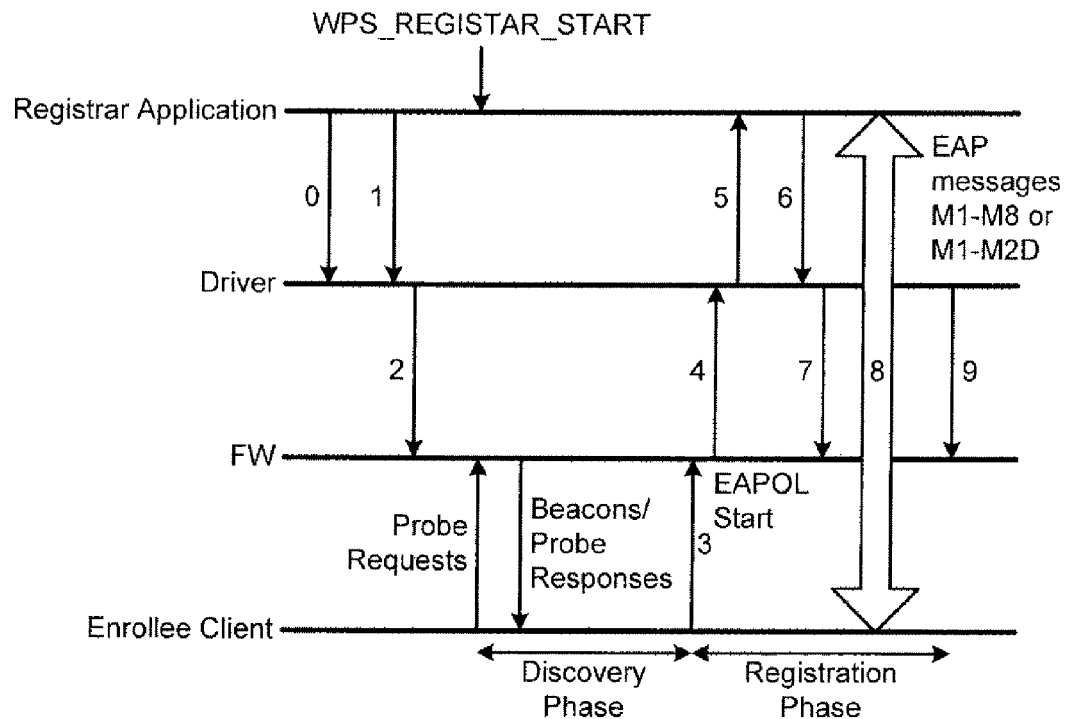
FIG. 4 shows a handshake sequence between an enrollee and a registrar, in accordance with one embodiment of the present invention.

FIG. 4 shows, in part, the handshake sequence between an enrollee and a registrar, in accordance with one embodiment of the present invention. The handshake sequence includes a discovery phase followed by a registration phase. The registration phase of the handshake is similar to that of an infrastructure wireless network. The discovery phase is described below with reference to a wireless network.

In response to a button press, or entry of a PIN on the registrar as described above, a signal called WPS_REGISTRAR_START is generated. In response, the registrar application driver causes signal WPS_IE to be included in the beacons and probe responses of the registrar, shown as event 0. During event 1, the registrar application, e.g. a Linux or a Windows application, designates the start of a registrar session to the driver. This designation may be made in response to a button press, a user command to initiate the registrar enrollment, or a PIN entry on the ad-hoc registrar. During event 2, (i) the driver sends an ad-hoc power-save exit command to the Firmware (FW); and (ii) the ad-hoc registrar is placed in an aggressive beaconing mode. The FW controls WLAN events of the discovery phase. When placed in the aggressive beaconing mode, the beacon contention window of the registrar is set to a relatively very small value in accordance with which beacons are transmitted by the registrar. After successful discovery of the registrar, the enrollee will send an EAP over LAN (EAPOL) frame signal signifying the end of the discovery phase, shown as event 3. Subsequently, the registration phase starts.

As mentioned above, in some embodiments, a WPS start of registrar session causes the registrar to exit the power-save mode and enter the aggressive beaconing mode, subsequent to which the beacon contention of the registrar is made very small relative to those of legacy devices. In yet other embodiments, the FW periodically places the registrar in the aggressive beaconing mode. The enrollee client may also be configured to set its scanning time equal to the periodicity of the registrar beaconing. This periodicity is configurable and represents a trade off between the registrar power savings and the enrollee client scan time.

Conventional techniques only allow the addition of one device to the ad-hoc network at a time. Referring to FIG. 4, if a first enrollee is sending EAP messages (e.g., M1-M8 or M1-M2D) to the registrar, represented by communication 8, the receipt of additional EAP messages from a second enrollee will result in the termination of the handshaking process, citing the presence of multiple enrollees. According to embodiments of the present invention, multiple enrollees are allowed to communicate with the registrar during the registration phase (e.g., transmitting EAP messages from multiple enrollees to the registrar) concurrently.

Figure 5:
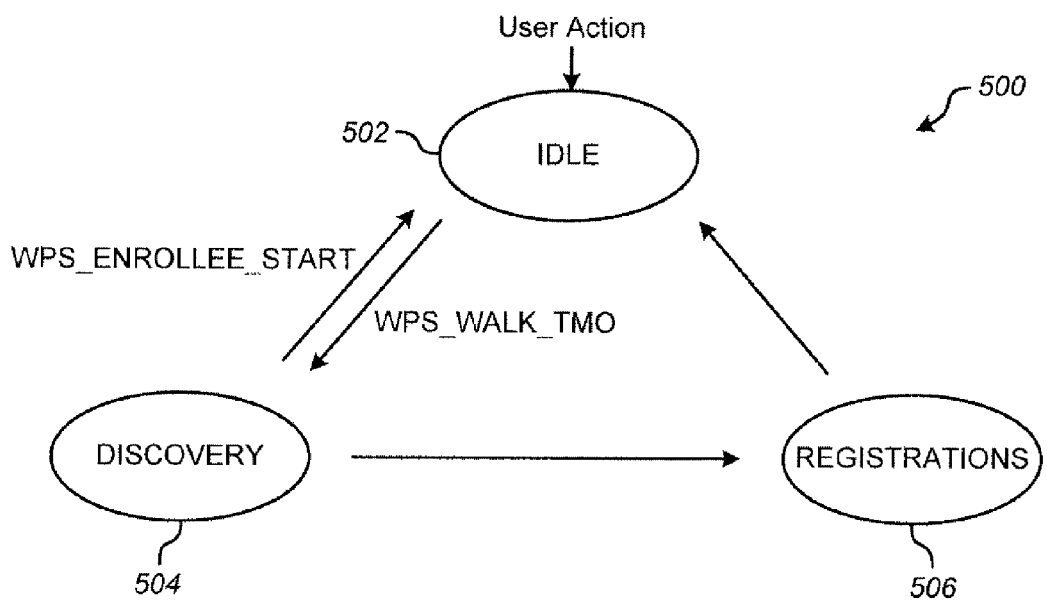
FIG. 5 is an exemplary state transition table associated with a registrar application, in accordance with one embodiment of the present invention.

FIG. 5 is an exemplary state transition table 500 associated with a registrar application, in accordance with one embodiment of the present invention. State transition table 500 is shown as having 3 states, namely Idle state 502, Discovery state 504 and Registrations state 506. The registrar remains in Idle state 502 until the user takes an action, e.g., by pressing a button, entering a PIN, issuing a voice command, or the like. In response to the user action, an event WPS_REGISTRAR_START forces a transition from Idle state 502 to Discovery state 504. While in Discovery state 504, if the registrar is not discovered within a predetermined time period WPS_WALK_TMO, a transition back to Idle state 502 occurs. If, on the other hand, the registrar is discovered prior to the expiration of the time period WPS_WALK_TIME, a transition to Registration state 506 is made. After a successful registration or a failure to register, a transition from Registration state 506 to Idle state 502 is made.

It should be noted that some conventional protocols, for security and other reasons, will abort the handshaking process if multiple enrollees attempt to enroll concurrently. These conventional protocols therefore only allow for the addition of one device to the ad-hoc network at a time. In such a protocol, the receipt of a second setup message while a first enrollee is registering, will be interpreted as a security violation and result in the second setup message being rejected and aborting the registration of the first enrollee. As discussed above, in a protocol utilizing such a serial registration process, to add M enrollee devices into the network, a user has to take an action (e.g., push a button on the registrar device or another action) M times, which is tedious for the user.

According to embodiments of the present invention, a portion of or all of the handshake sequence illustrated in FIG. 4 is performed concurrently by multiple enrollees and the registrar. In order to provide the functionality to support multiple concurrent handshake sequences, the registrar is provided with multiple state transition tables (alternatively referred to as state machines), with each state transition table corresponding to one of the multiple enrollees. During the handshaking sequence, each state machine will be instantiated and maintain the status of each of the individual enrollees. As an example, during the registration process, the registrar may track the identity of the enrollees that are involved in the concurrent handshaking sequences.

Figure 6:
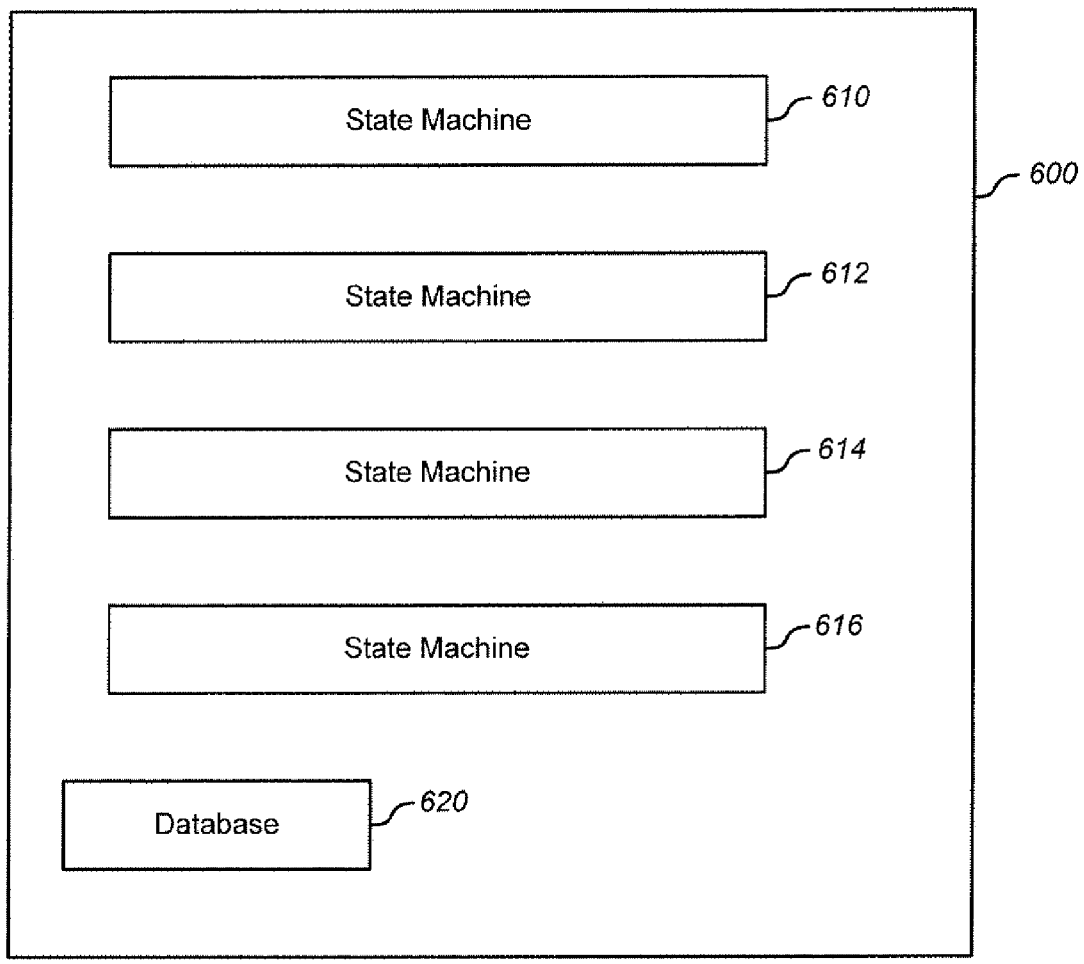
FIG. 6 is a simplified illustration of a registrar having multiple state machines according to an embodiment of the present invention.

FIG. 6 is a simplified illustration of a registrar 600 having multiple state machines according to an embodiment of the present invention. As illustrated in FIG. 6, registrar 600 includes four state machines 610, 612, 614, and 616. Thus, registrar 600 is adapted to support concurrent registration by four enrollees. In other embodiments, additional state machines are provided as appropriate to a particular application. One of ordinary skill in the art would recognize many variations, modifications, and alternatives. The registrar may also maintain a database 620 including data related to the one or more concurrent registration processes and the wireless network. For example, the database may include one or more fields adapted to store a limit to the number of enrollee devices that will be able to register concurrently, the total number of devices allowed to join the ad-hoc network, the rate at which enrollees are allowed to join the network, and the like. The database is programmable, enabling the registrar to modify data stored in database 620. The number of enrollee devices that will be able to register concurrently is application dependent. Since, in many applications, the maximum number of concurrent enrollees is only provided at the registrar, embodiments of the present invention do not impact interoperability, enabling operation in conventional modes.

The state machines 610-614 may be included in one or more general purpose processors configured to execute instructions and data. In some embodiments, such state machines may be carried out using dedicated hardware such as an application specific integrated circuit (ASIC). In yet other embodiments, such state machines and the operation of the registration process may be carried out using a combination of software and hardware. As an example, such implementations include dedicated circuitry, ASICs, combinatorial logic, other programmable processors, combinations thereof, and the like.

In operation, registrar 600 will begin a first handshake sequence as illustrated in FIG. 4 with a first enrollee. State machine 610 will maintain the status of the first handshake sequence as well as information related to the first enrollee. At a time prior to completion of the first handshake sequence, registrar 600 will concurrently begin a second handshake sequence as illustrated in FIG. 4, but with a second enrollee. State machine 612 will maintain the status of the second handshake sequence as well as information related to the second enrollee. Additional enrollees will be added to the ad-hoc network in a similar manner, each of the additional enrollees being associated with an additional state machine.

In some embodiments, after a first registration process is completed, the corresponding state machine may be instantiated a second time for use with another enrollee. One of ordinary skill in the art would recognize many variations, modifications, and alternatives.

Although some embodiments of the present invention provide reduced security as a result of the capability of concurrently registering multiple enrollees, which may include a hacker as well as authorized devices, improvements in the user experience generally outweigh the risks associated with system security. For example, in a multi-player gaming environment utilizing portable gaming stations, the risk of a hacker attempting to access the ad-hoc network is negligible since the information stored in the portable gaming stations is limited. As a result, in such applications, the improvements in usability provided by easy establishment of the ad-hoc network between multiple devices outweigh perceived security risks.

Figure 7:
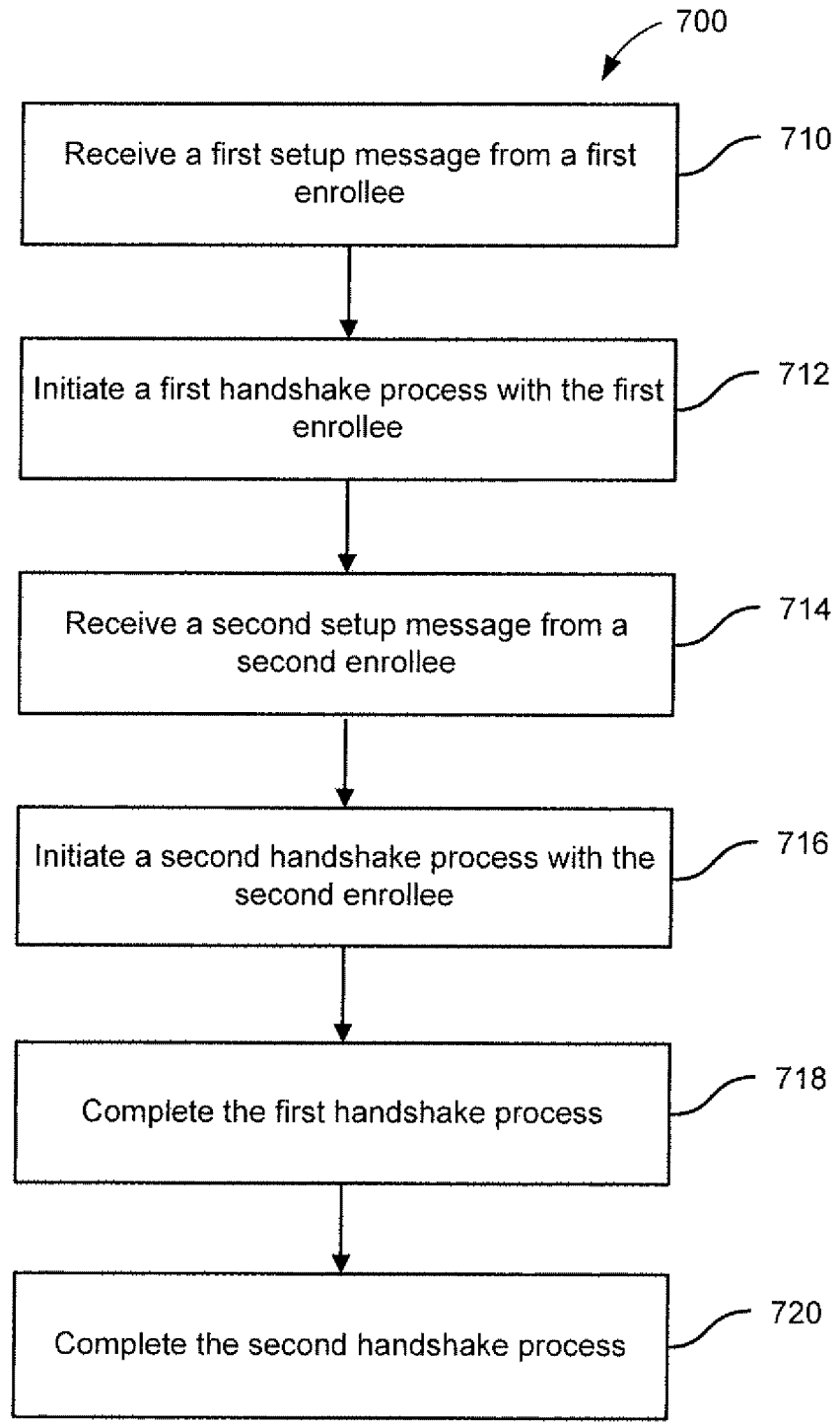
FIG. 7 is an exemplary flowchart of steps carried out to form an ad-hoc wireless network between a set of two enrollee devices concurrently registering with an authenticator in accordance with one embodiment of the present invention.

FIG. 7 is an exemplary flowchart of steps carried out to form an ad-hoc wireless network between a set of two enrollee devices concurrently registering with an authenticator in accordance with one embodiment of the present invention. According to an embodiment, the authenticator is a registrar and the devices seeking authentication are enrollees. For purposes of clarity, the term enrollee is used in relation to FIG. 7. The method 700 includes receiving a first setup message (e.g., an EAP message) transmitted from a first enrollee to an authenticator (710). The authenticator initiates a first handshake or registration process with the first enrollee (712). The first handshake process includes instantiating a first state machine associated with the first enrollee. The first enrollee initiates an EAP exchange and attempts to perform a push button configuration (PBC) handshake with the authenticator as part of the first handshake process. In some embodiments, the PBC handshake conforms to standards defined by the Wi-Fi Protected Setup™ standard. Additional description of the handshake process is provided throughout the present specification, for example, with respect to FIGS. 4, 8, and 9.

The method also includes receiving a second setup message transmitted from a second enrollee to the authenticator (714). The second setup message is received by the authenticator prior to completion of the first handshake process. A second handshake process is initiated between the authenticator and the second enrollee (716). The second handshake process includes instantiating a second state machine associated with the second enrollee. The second enrollee initiates an EAP exchange and attempts to perform a PBC handshake with the authenticator as part of the second handshake process.

According to embodiments of the present invention the second handshake process is initiated prior to the completion of the first handshake process. As a result, the first handshake process and the second handshake process proceed concurrently. The first handshake process is completed (718) and the second handshake process is completed (720), generally after the first handshake process is completed. As will be evident to one of skill in the art, it is not required that the second handshake process is completed after the first handshake process is completed.

It should be appreciated that the specific steps illustrated in FIG. 7 provide a particular method of concurrently forming an ad-hoc wireless network between a set of two enrollee devices and an authenticator according to an embodiment of the present invention. Other sequences of steps may also be performed according to alternative embodiments. For example, alternative embodiments of the present invention may perform the steps outlined above in a different order.

Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
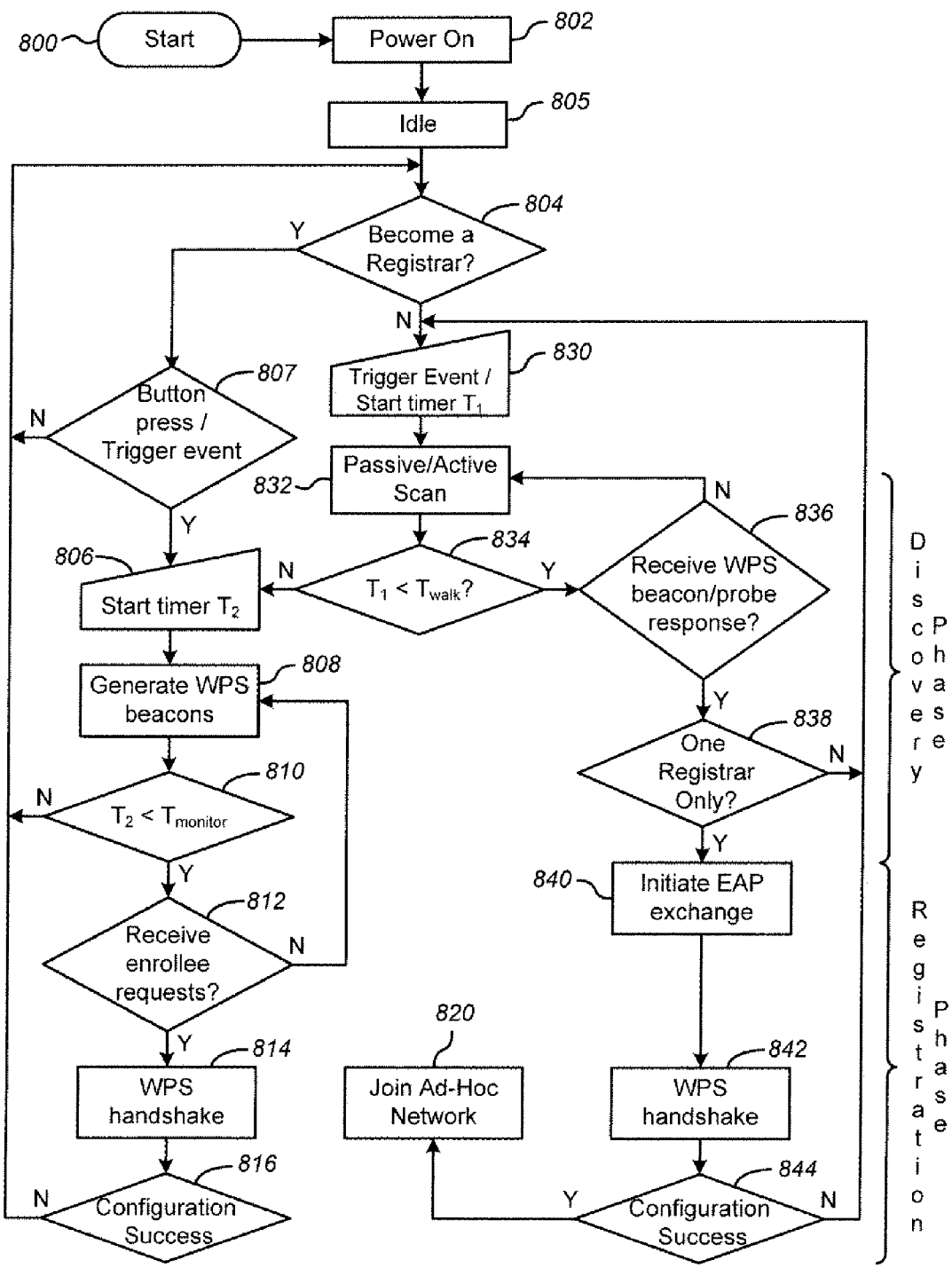
FIG. 8 is an exemplary flowchart of steps carried out to form an ad-hoc wireless network between a pair of devices, in accordance with one embodiment of the present invention.

FIG. 8 is an exemplary flowchart of steps carried out to form a wireless ad-hoc network between two devices, one of which will become a registrar and one an enrollee. The process starts at step 800 after which the devices are powered on (802). After power up, the device may enter an idle mode (805) and behave in a normal ad-hoc mode unaware of WPS. If a decision is made to configure the device as a registrar (804), the registrar proceeds toward step 807. Next, in response to either a user button press or a trigger (807), a timer $T_2$ is started (806) and the device starts to aggressively transmit beacons (808). A device configured as a registrar (804) remains in an idle mode (805) if the user does not press a button or the periodic beaconing is not triggered. While the timer's elapsed time is smaller than a predefined time $T_{monitor}$ (810), the registrar continues to look for enrollee requests (812). If the registrar receives a probe request from an enrollee within period $T_{monitor}$, an attempt to form a WPS handshake is made (814). If the handshake is made and enrollee configuration or provisioning is successful (816), the registrar may establish communication over the established ad-hoc network. If the enrollee configuration or provisioning is unsuccessful (816), the process moves back to step 804. If the registrar does not receive an enrollee request within the time period $T_{monitor}$, the process moves back to step 808. Once the timer $T_2$'s elapsed time becomes greater than $T_{monitor}$ (810), the process moves back to step 805. In some exemplary embodiments, the predefined time $T_{monitor}$ ranges from about 30 seconds to about 240 seconds. In one exemplary embodiment, the predefined time $T_{monitor}$ is 120 seconds.

If a decision is made not to configure the device as a registrar (804), the device becomes an enrollee and a timer $T_1$ is started (830). Additionally, the timer T1 may be started in response to an trigger event such as a button push. The enrollee starts to scan for a registrar (832). While the timer $T_1$'s time is smaller than a predefined time $T_{walk}$ (834), the enrollee continues to look for probe responses from a registrar (836). In a passive scanning mode, the enrollee may look for beacons. If the enrollee detects probe response from a registrar (836), the enrollee checks to see whether other registrars are present (838). If the enrollee detects more than one registrar, the process moves back to step 830. If the enrollee discovers no registrar or discovers more than one registrar, the enrollee may proceed with creating its own ad-hoc network and starting a registrar application. As will be evident to one of skill in the art, such behavior may not be desirable in some applications. Only if the enrollee discovers a single registrar, does the enrollee proceed to register with the discovered registrar. If the enrollee detects a single registrar, it initiates an EAP exchange (840), and attempts to perform a WPS handshake (842). Thereafter, following a successful handshake and successful enrollee configuration or provisioning (844), the enrollee may attempt to use the network credentials obtained from the registrar to join the network. After a successful enrollee configuration or provisioning, if the enrollee is capable of serving as a registrar, the enrollee may attempt to act as a registrar for the adhoc network in conformity with which the enrollee periodically lowers its beacon contention window and attempts to add more enrollees. If the enrollee does not detect a probe response from a registrar within period $T_{walk}$, the enrollee starts its own registrar application to become a registrar (806).

Embodiments of the present invention provide for extension of the time period $T_{monitor}$ in comparison with conventional techniques. The extended time window provides a time period suitable for allowing multiple enrollees to concurrently join the network. As a result, rather than setting the time period $T_{monitor}$ at a time appropriate for a single registration process, the duration of the time window is extended as appropriate to support the concurrent and likely overlapping registration processes. The time window is programmable, allowing for modification of the duration of the time window based on the environment and the number of enrollees that the registrar expects will join the network.

While the time window is extended in comparison to the time window for a single registration process, the extended time window will generally be less than the sum of the time windows associated with a series of serial registration processes. As a result, embodiments of the present invention reduce power consumption and reduce the time a user waits in comparison with conventional techniques. In particular, since multiple enrollees are able to negotiate with the registrar concurrently, the power used by the registrar to generate beacons during the concurrent registration process will be reduced in comparison with the power used during am equal number of serial registration processes.

The time window is programmable, providing flexibility depending on operating conditions and the application. As an example, a greater number of potential enrollees will result in a larger time window. The extended time window also provides for retransmissions and other system delays. One of ordinary skill in the art would recognize many variations, modifications, and alternatives.

Figure 9:
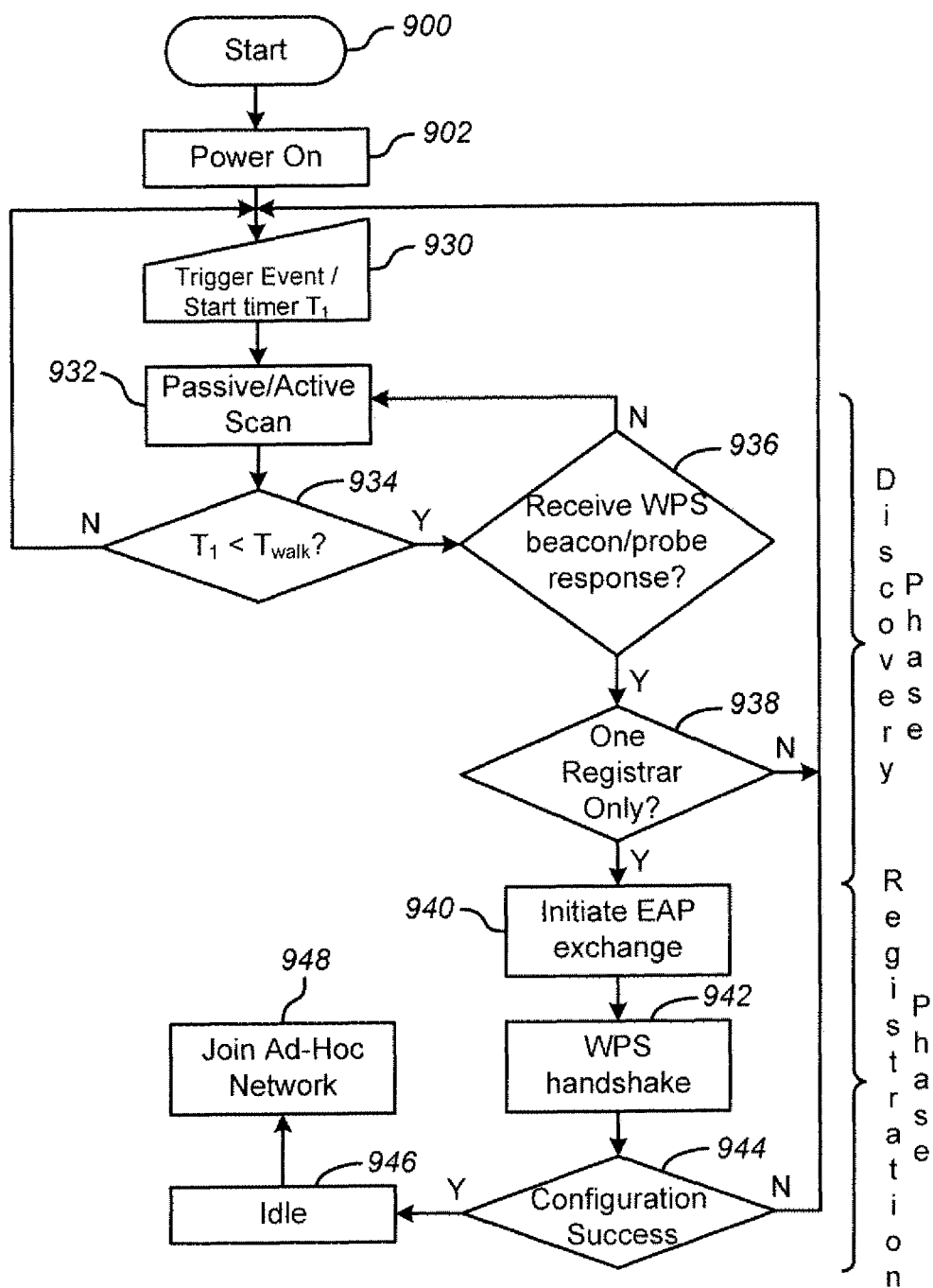
FIG. 9 is a flowchart of steps carried out by an enrollee to join an existing ad-hoc wireless network, in accordance with one embodiment of the present invention.

FIG. 9 is a flowchart of steps carried out by an enrollee to join an existing ad-hoc network. The steps illustrated in FIG. 9 may be performed by multiple enrollees and a single registrar concurrently. The process starts at step 900 following which the enrollee is powered on (902). After a timer $T_1$ is started (930), the enrollee starts to scan for a registrar (932). While the timer $T_1$'s elapsed time is smaller than a predefined time $T_{walk}$ (934), the enrollee continues to look for probe responses from a registrar (936). In a passive scanning mode, the enrollee may look for beacons. If the enrollee detects a probe response from a registrar (936), the enrollee checks to see whether other registrars are present (938). If the enrollee detects more than one registrar, the process moves back to step 932. If the enrollee discovers no registrar or discovers more than one registrar, the enrollee may proceed with creating its own ad-hoc network and starting a registrar application. As will be evident to one of skill in the art, such behavior may not be desirable in some applications. Only if the enrollee discovers a single registrar, does the enrollee proceed to register with the discovered registrar. If the enrollee detects a single registrar, it initiates an EAP exchange (940), and attempts to perform an PBC handshake (942). Thereafter, following a successful handshake and successful enrollee configuration or provisioning (944), the enrollee may attempt to use the network credentials obtained from the registrar to join the network. After a successful enrollee configuration or provisioning, if the enrollee is capable of serving as a registrar, the enrollee may attempt to act as a registrar for the ad-hoc network it has joined in conformity with which the enrollee periodically lowers its beacon contention window and attempts to add more enrollees.

Figure 10:
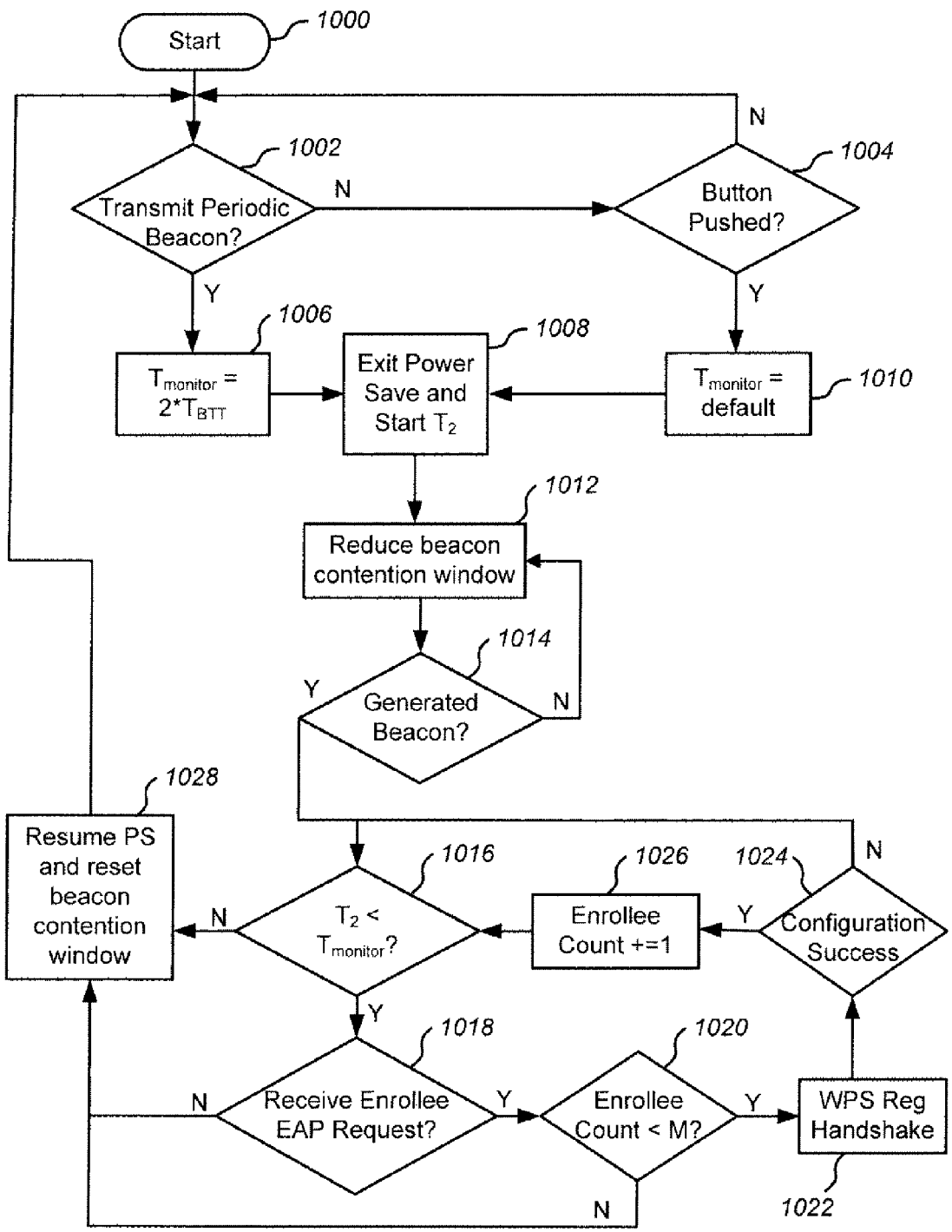
FIG. 10 is a flowchart of steps carried out by multiple enrollees to concurrently join an existing ad-hoc wireless network, in accordance with another embodiment of the present invention.

FIG. 10 is a flowchart of steps carried out by multiple enrollees to concurrently join an existing ad-hoc wireless network, in accordance with another embodiment of the present invention. The process illustrated in FIG. 10 includes a series of steps taken by a registrar to enter into an aggressive beaconing mode so as to be discovered by an enrollee. Following the start of the process at step 1000, a determination is made as to whether it is time for the registrar to generate beacons (1002). If it is determined that the registrar is required to generate beacons (1002), a predefined time or parameter $T_{monitor}$ is set to twice the value of the target beacon transmission time (TBTT) (1006). Next, the registrar exits the power save mode and starts timer $T_2$ (1008). If, on the other hand, periodic beacons are not transmitted, then a determination is made in step 1004 if a button was pushed. For example, the button may be a push-button device that is used to indicate a user's desire to join the existing ad-hoc network or to allow enrollee devices to join the network. If the button is pushed, then the predefined time $T_{monitor}$ is set to a default value.

After exiting the power save mode and starting timer $T_2$ (1008), the registrar reduces its beacon contention window (1012). While in an aggressive beaconing mode, i.e., reduced beacon contention window mode, the registrar listens to beacons from other registrars. So long as the registrar detects beacons from other registrars (1014), the registrar does not generate its own beacons (i.e., only for the current beacon period), and continues to reduce its beacon contention window (1012). However, if the registrar does not detect beacons from other registrars, it generates its own beacons using its last beacon contention window (1014).

Following beacon generation, if timer $T_2$'s value is determined as being greater than or equal to the predefined time $T_{monitor}$ (1016), the registrar resumes the power-save mode and resets its beacon contention window to its starting value (1028). While timer $T_2$'s value is determined to be less than $T_{monitor}$ (1016), the registrar continues to look for probe requests from an enrollee (1018). If the registrar detects an enrollee probe request (e.g., an EAP request represented by an EAPOL_START frame), then a determination is made if the enrollee count is less than a predetermined value M in step 1020. The determination made in step 1020 enables the registrar to limit the number of concurrent enrollees to a predetermined value M for security or other reasons. If the enrollee count has reached or exceeds the predetermined value M, then the process advances to step 1028. However, if additional enrollees are allowed to register, then the WPS registration handshake process is performed (1022), which results in a determination of configuration success (1024) upon completion. After the determination of configuration success is made, the number of enrollees, represented by an enrollee count is incremented by one (1026). The process than advances to step 1016, where the determination of whether the timer $T_2$ is less than the predefined time $T_{monitor}$ is repeated. If $T_2$ is greater than or equal to $T_{monitor}$ or the maximum number of enrollees has been registered, then the registrar resumes the power-save mode and resets its beacon contention window to its starting value (1028). Thus, up to M enrollees can be added (with up to M added concurrently) after a single button push (or other action) on the part of the ad-hoc device acting as the registrar.

Embodiments of the present invention provide for conservation of battery resources, which is a design factor of interest in consumer electronics products in the context of ad-hoc networks. Because the registrar can enter into the power save mode on a periodic basis, battery consumption is reduced. Moreover, using embodiments of the present invention, a CE device is able to merge or coalesce with other devices using the procedures described herein.

Figure 11:
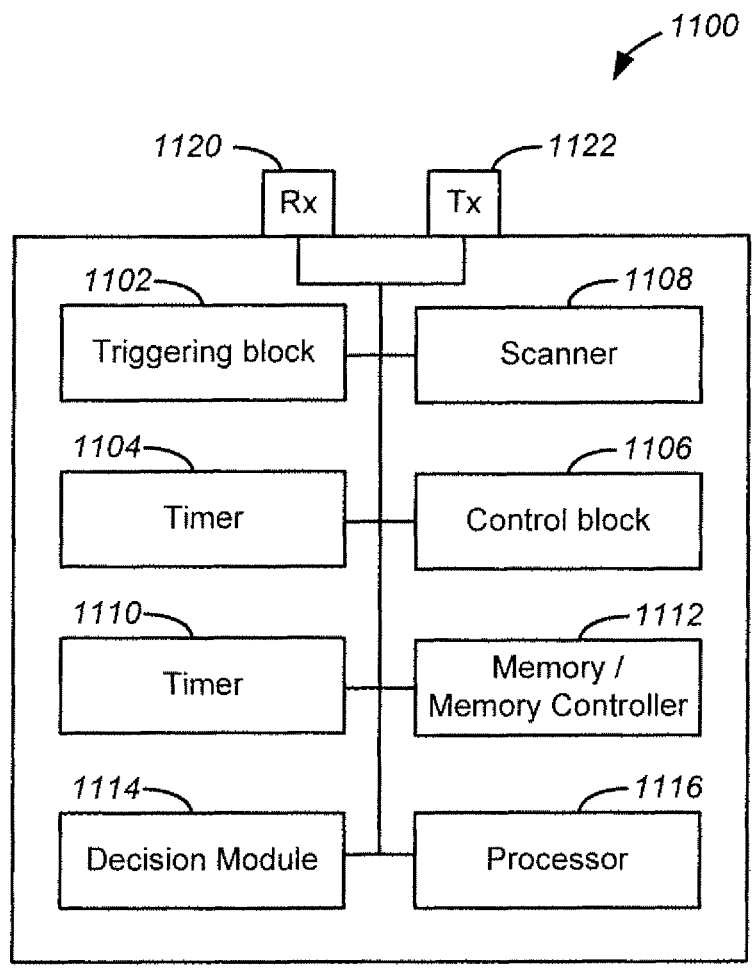
FIG. 11 shows various hardware blocks of a device adapted to be configured as an enrollee and/or a registrar, in accordance with one embodiment of the present invention.

FIG. 11 shows a hardware block diagram of a device 1100 adapted to be configured as an enrollee and/or a registrar, in accordance with one embodiment of the present invention. Device 1100 is shown as including, in part, a triggering block 1102, timers 1104, 1110, controller 1106 and scanner 1108. Triggering block 1102 is configured to trigger an event in response to a user action. For example, when device 1100 is powered on, triggering block 1102 starts first timer 1104. Controller 11006 configures device 1000 as an enrollee if triggering block 1102 detects a second user action before timer 11004's elapsed time reaches a predefined time. Controller 1106 configures device 1100 as a register if triggering block 1102 does not detect a second user action when timer 1104's elapsed time reaches the predefined time. Controller 1106 also modifies the beacon contention window of device 1100. Scanner 1108 scans for beacons transmitted by the registrars if device 1100 is configured as an enrollee. Timer 1110 is used to determine whether probe requests are received within a given time period if device 1100 is configured as a registrar. Timer 1110 is also used to determine whether probe responses are received within a given time period if device 1100 is configured as an enrollee.

Additionally, device 1100 includes one or more ports adapted to receive (1120) and transmit (1122) signals to and from the device to other devices. One or more memories 1112, decision modules 1114, and processors 1116 are provided in device 1100 in order to control operations of the device 1100. It is understood that the various functional blocks otherwise referred to herein as processors, engines, modules, and the like, including those shown in FIG. 11, may be included in one or more general purpose processors configured to execute instructions and data. In some embodiments, such blocks may be carried out using dedicated hardware such as an application specific integrated circuit (ASIC). In yet other embodiments, such blocks and the processing of transmitted and received signals may be carried out using a combination of software and hardware. As an example, such processors include dedicated circuitry, ASICs, combinatorial logic, other programmable processors, combinations thereof, and the like.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method used to configure an ad-hoc wireless network between an authenticator and a plurality of wireless devices seeking authentication, the method comprising:
    initiating a first handshake process between the authenticator and the first device seeking authentication, the first handshake process being initiated in response to a triggering event;
    receiving a setup message transmitted from a second device seeking authentication to the authenticator, wherein the setup message is received by the authenticator prior to completion of the first handshake process; and
    initiating a second handshake process between the authenticator and the second device seeking authentication, wherein the second handshake process is initiated prior to completion of the first handshake process.

2. The method of claim 1 wherein the authenticator comprises a registrar and the plurality of wireless devices seeking authentication comprise a plurality of enrollees; and
    further comprising:
        completing the first handshake process; and
        completing the second handshake process.

3. The method of claim 1 wherein the first handshake process and the second handshake process are performed concurrently.

4. The method of claim 3 further comprising determining whether the second device is an authorized enrollee.

5. The method of claim 4 wherein determining whether the second device is an authorized enrollee is based on a number of current enrollees.

6. The method of claim 1 wherein the authenticator, the first device seeking authentication, and the second device seeking authentication comprise wireless gaming devices.

7. The method of claim 1 wherein the wireless device is assigned as the authenticator based on input from a user of the wireless device, the authenticator comprising a registrar.

8. The method of claim 1 wherein the authenticator maintains a first state machine associated with the first device seeking authentication and a second state machine associated with the second device seeking authentication.

9. The method of claim 8 wherein the authenticator maintains a database adapted to store information related to the first handshake process and the second handshake process.

10. The method of claim 1 wherein the setup message comprises a second setup message;
further comprising receiving a first setup message transmitted from the first device seeking authentication; and
wherein the first setup message is transmitted in response to a user action taken on the first device seeking authentication.

11. The method of claim 1, wherein the triggering event comprises a single user action taken on the authenticator, and wherein initiating the first handshake process and initiating the second handshake process are performed in response to the single user action taken on the authenticator.

12. A wireless device used to configure an ad-hoc wireless network between the wireless device and a plurality of wireless devices seeking authentication, the wireless device comprising:
an interface configured to receive a setup message; and
at least one processor in communication with the interface and configured to:
initiate a first handshake process with a first device seeking authentication, the first handshake process being initiated in response to a triggering event;
in response to receiving the setup message transmitted from a second device seeking authentication, initiate a second handshake process with the second device seeking authentication,
wherein the setup message is received prior to completion of the first handshake process, and
wherein the second handshake process is initiated prior to completion of the first handshake process.

13. The wireless device of claim 12 wherein the wireless device comprises a registrar and the plurality of wireless devices seeking authentication comprise a plurality of enrollees.

14. The wireless device of claim 12 wherein the at least one processor is configured to perform the first handshake process and the second handshake process concurrently.

15. The wireless device of claim 14 wherein the at least one processor is further configured to determine whether the second device is an authorized enrollee.

16. The wireless device of claim 15 wherein the at least one processor is configured to determine whether the second device is an authorized enrollee based on a number of current enrollees.

17. The wireless device of claim 12 wherein the wireless device, the first device seeking authentication, and the second device seeking authentication comprise wireless gaming devices.

18. The wireless device of claim 12 wherein the wireless device is assigned as an authenticator based on input from a user of the wireless device, the authenticator comprising a registrar.

19. The wireless device of claim 18 wherein the triggering event comprises a single user action taken on the authenticator, and wherein the at least one processor is configured to initiate the first handshake process and initiate the second handshake process in response to a single user action taken on the authenticator.

20. The wireless device of claim 12 wherein the at least one processor is configured to perform the first handshake process according to a first state machine and to perform the second handshake process according to a second state machine.

21. The wireless device of claim 20 further comprising a database configured to store information related to the first handshake process and the second handshake process.

* * * * *